United States Patent Office 2,988,518
Patented June 13, 1961

2,988,518
PREPARATION OF PLASTIC KAOLIN FOR EXTRUSION
Thomas H. Milliken, Jr., Moylan, Pa., assignor to Houdry Process Corporation, Wilmington, Del., a corporation of Delaware
No Drawing. Filed June 2, 1955, Ser. No. 512,851
5 Claims. (Cl. 252—450)

The present invention relates to the preparation of clay mixtures suitable for extrusion, and more particularly, to a method for preparing plastic kaolin clays for extrusion into pelleted catalyst useful for hydrocarbon conversion reactions, and having enhanced adsorptivity characteristics.

Certain clays, such as the sub-bentonite clays of the montmorillonite series, have relatively poor adsorptivity and recolorizing activity in their raw state and are also substantially inert or impractical for use in this state as hydrocarbon conversion catalysts. By a familiar treatment with mineral acid, these clays become activated; and such acid activation of these clays has been widely employed to produce the well-known acid-activated clays of commerce, which are used as adsorptive decolorizing agents for oils and as catalysts in hydrocarbon conversion operations such as cracking.

There are many common and abundant clays, however, such as kaolins (including halloysite clays) which do not respond to the conventional methods of activation to produce catalysts having cracking activity at levels comparable with that of the aforementioned commercial acid activated sub-bentonite clays, nor do these clays possess after acid treatment comparable or desired decolorizing activity.

A number of useful procedures for treating the natural hydrosilicates of aluminum including clays of the kaolin types, as well as sub-bentonite clays have been developed recently; and by these methods, relatively inactive clays and earths are transformed into active masses useful as hydrocarbon conversion catalysts. An example of such useful method for converting relatively inactive clays and earths into active masses comprises contacting such clays with gases comprising sulphur trioxide, at relatively high temperatures such as between about 650 to 900° F.

It has been found necessary that kaolin pellets exposed to such activation treatment, such as the aforesaid exposure to sulphur trioxide at elevated temperatures, possess good physical characteristics, and especially good hardness characteristics; particularly as such pellets may be subsequently used in a catalytic conversion unit employing a moving catalyst bed. In order to obtain a hard catalyst having satisfactory ball hardness and air jet attrition testing characteristics, it is essential that selected conditions of mixing prior to extrusion be adopted and that the concentration of water and the mode of forming the extrusion mixtures be closely regulated.

I have found that it is necessary in order to obtain maximum ball mill hardness that the mix water content be maintained as low as possible. We have further found that pellets of improved hardness can be produced by first forming a slurry of plastic kaolin containing from 10 to 40% by weight of clay, and then adding the remainder of the clay in a dry pulverized form to the aforesaid mixture in a suitable solids mixer, such as a pug mill, edge runner, or other commercial mixer or kneader comprising means for manipulating a plastic mass. The aforesaid mass is mixed until the desired extrusion consistency is obtained. The extrusion may then be extruded into pellets having improved hardness characteristics, rendering such pellets particularly suitable for sulfation or acid activation under rigorous conditions.

The process of my invention is particularly applicable to the so-called plastic kaolins, that is the kaolin type clays which form plastic mixtures when admixed with water.

Examples of such clays include pulverized "Edgar EPK" kaolin clay obtained from Putnam County, Florida; and Jackson ball clay obtained from the Kentucky-Tenn. Clay Co., of Mayfield, Ky.

*Example*

The raw clay treated in this example was a kaolin clay from Putnam County, Florida, known as "Edgar EPK" which gave the following anaylsis on a dry (105° C.) sand-free basis:

| | Percent |
|---|---|
| Ignition loss | 12.9 |
| $SiO_2$ | [1] 46.6 |
| $Al_2O_3$ | [1] 38.8 |
| $Fe_2O_3$ | 1.0 |
| CaO | 0.44 |
| MgO | 0.23 |
| $TiO_2$ | 0.35 |
| Alk. metal (as oxide) | 0.52 |

[1] $SiO_2/Al_2O_3 = 1.2$.

The above clay was slurried with water to produce a 30:70 weight ratio of clay to water. A minor amount of ammonium hydroxide sufficient to raise the pH of the slurry to a pH in the range of 8 to 9 was added as a deflocculating agent in order to keep the slurry of clay and water pourable. The slurry was then poured into a commercial mixer, and pulverized clay was slowly added thereto with intimate mixing to form a homogenous mass of plasticized material suitable for extrusion. Sufficient additional pulverized plastic kaolin was added to the mixture to reduce the water content to a level of about 25 to 35 weight percent water.

The aforesaid plasticized mass was extruded into pellets which after drying and calcining at 1350° F. in 100% steam had a ball mill hardness between about 84 to 92 and a knife edge hardness of 8,000 to 10,000 grams.

Pellets of the above calcined clay were sulfated at 700° F. by exposure to a gas consisting of forty-five mole percent sulfur trioxide and fifty-five mole percent steam for a period of eight hours. The resultant sulphated pellets were desulfated at 1350° F. by exposure to a gas comprising 10 mole percent of hydrogen and 90 mole percent of steam for a period of four hours.

The resultant catalyst had a surface area of 90 square meters per gram, a bulk density of 0.95 kilogram per liter, a ball mill hardness index of 92, and a knife edge hardness in excess of 9500 grams. When this sulphated catalyst was subjected to a standard test for catalytic activity, namely the CAT–A method described in "Laboratory Method for Determining the Activity of Cracking Catalyst," by J. Alexander and H. G. Shimp, page R537, National Petroleum News, August 2, 1944, it produced a yield of 31.0 percent gasoline, 3.0 coke, and 6.3 percent gas.

The hardness index (H.I.) of the catalyst was determined by a standard test designed as an empirical measure of frictional attrition. In this test the catalyst pellets of #3 to #5 screen size are rotated with steel balls in a cylindrical can on its longitudinal axis at constant speed for an hour. The hardness index (H.I.) is then computed by weighing the catalyst retained on a #6 screen, thus:

$$H.I. = \frac{Wt. \#6 \text{ fraction} \times 100}{Wt. \text{ of original } (\#3 \text{ to } \#5) \text{ sample}}$$

Knife-edge hardness is determined by loading a knife edge (of the type used in analytical balances), placed upon the cylindrical surface of the pellet, until the pellet breaks.

A comparison between the aforesaid slurry mixing method and prior non-slurry mixing methods for similar clays dried in a laboratory drier at 240° F. yielded clay pellets by the method of the present invention having a bulk density of 0.97 kilogram per liter, a knife-edge hardness of 12,000+, a ball mill hardness index of 89 and a jet attrition percent loss of 21. Clay pellets derived from the prior non-slurry mixing method had a bulk density of 0.96 kilogram per liter, a knife-edge hardness of 9400 grams, a 4-ball hardness index of 91, and a jet attrition percent loss of 49.

Jet attrition is determined by forcing a jet of air through a layer of the catalyst in an inverted Erlenmeyer flask for one hour to cause the pellets to strike the walls and bottom of the flask. The loss in weight of fines blown out by the jet is recorded as "jet attrition percent loss."

I have found that catalysts produced by the process of the present invention have superior hardness characteristics, and thus may be exposed to relatively severe handling without injury, and further add to the useful life in commercial units. While I do not wish to be bound by any theory of explanation for the efficiency of my method, I believe that those particles of clay which are slurried with water become finely dispersed and this slurry coats the particles of clay that are added in the second or mixing step thus forming a binder to join the clay particles in the mix together.

Obviously many modifications and variations of the invention as hereinbefore set forth may be made without departing from the spirit and scope thereof and therefore only such limitations should be imposed as are indicated in the appended claims.

I claim as my invention:

1. The method of forming hard clay pellets from an extrusion mass which comprises slurrying a plastic kaolin with water to form a pourable slurry containing from 10 to 40 weight percent of plastic kaolin, adding additional pulverized dry plastic kaolin to said slurry, and intimately mixing the added kaolin and slurry mixture to form a plasticized homogeneous mass having a water content in the range of 25-35% by weight, extruding said mass as pellets, and drying and calcining said pellets.

2. The method of forming an extrusion mass suitable for extrusion into pellets useful as a catalyst which comprises slurrying a plastic kaolin with a sufficient amount of water to form a slurry mixture that may be poured, adding additional pulverized dry plastic kaolin to said mixture in an amount such that the water content of the extrusion mass is between about 25-35% by weight, and intimately mixing the added kaolin and slurry mixture to form a plasticized homogeneous mass suitable for extrusion.

3. The process for the preparation of strong active hydrocarbon conversion catalyst from kaolin which includes sulfating pelleted kaolin with sulfur trioxide at a temperature in the range of 650° to 900° F., and subsequently desulfating said sulfated kaolin in the presence of hydrogen at a temperature in the order of 1300° F., said process incorporating the improvement in the preparation of said pelleted kaolin comprising, slurrying a plastic kaolin with water to form a pourable slurry containing from 10 to 40 weight percent of plastic kaolin, adding to said slurry additional pulverized dry plastic kaolin and obtaining thereby a mixture containing about 25 to 35 weight percent water, intimately mixing said added kaolin and slurry to form a plasticized homogeneous mass suitable for extrusion, extruding said mass into pellets, and drying said pellets.

4. The process in accordance with claim 3 wherein said dried pellets, prior to said sulfation, are calcined at a temperature of about 1350° F. in the presence of steam.

5. The process in accordance with claim 3 wherein said pourable slurry has a pH in the range of 8 to 9 resulting from the addition of ammonium hydroxide.

References Cited in the file of this patent

UNITED STATES PATENTS

| | | |
|---|---|---|
| 1,492,184 | Weir et al. | Apr. 29, 1924 |
| 1,544,210 | Bierce | June 30, 1925 |
| 1,781,265 | Bayliss | Nov. 11, 1930 |
| 2,019,618 | McKinley et al. | Nov. 5, 1935 |
| 2,322,674 | Thomas | June 22, 1943 |
| 2,375,641 | Garrison | May 8, 1945 |
| 2,466,046 | Shabaker et al. | Apr. 5, 1949 |
| 2,759,899 | Hanson | Aug. 21, 1956 |

FOREIGN PATENTS

| | | |
|---|---|---|
| 239,169 | Great Britain | July 6, 1926 |

OTHER REFERENCES

Searle's "Refractory Materials," London (1950), page 280.